(12) United States Patent
Taniguchi et al.

(10) Patent No.: US 12,074,945 B2
(45) Date of Patent: Aug. 27, 2024

(54) DATA COLLECTION SYSTEM AND DATA COLLECTION METHOD

(71) Applicant: NIPPON TELEGRAPH AND TELEPHONE CORPORATION, Tokyo (JP)

(72) Inventors: Tomohiro Taniguchi, Musashino (JP); Shinya Tamaki, Musashino (JP); Tetsuya Suzuki, Musashino (JP); Yasutaka Kimura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 36 days.

(21) Appl. No.: 17/800,739

(22) PCT Filed: Feb. 21, 2020

(86) PCT No.: PCT/JP2020/007248
§ 371 (c)(1),
(2) Date: Aug. 18, 2022

(87) PCT Pub. No.: WO2021/166261
PCT Pub. Date: Aug. 26, 2021

(65) Prior Publication Data
US 2023/0105373 A1   Apr. 6, 2023

(51) Int. Cl.
*H04L 67/12* (2022.01)

(52) U.S. Cl.
CPC .................... *H04L 67/12* (2013.01)

(58) Field of Classification Search
CPC ......... H04L 67/12; H04L 41/12; H04L 41/34; H04L 67/567; H04W 4/70; H04W 4/38; Y02D 30/00
See application file for complete search history.

(56) References Cited

U.S. PATENT DOCUMENTS

2014/0155031 A1   6/2014  Lee et al.
2014/0361906 A1* 12/2014  Hughes .................... H04Q 9/00
                                                340/870.01
(Continued)

FOREIGN PATENT DOCUMENTS

JP   2009260778 A   11/2009
JP   2014110638 A    6/2014

OTHER PUBLICATIONS

Yoshiyuki Mihara et al., Designing HTIP which Identifies Home Network Topology and Applying HTIP to a Troubleshooting Application, Information Processing Society Journal Consumer Device & System, vol. 2, No. 3, 2012, pp. 34-45.

(Continued)

*Primary Examiner* — Chris Parry
*Assistant Examiner* — Hassan A Khan
(74) *Attorney, Agent, or Firm* — Harness, Dickey & Pierce, P.L.C.

(57) ABSTRACT

An object of the present disclosure is to provide a data collection system capable of collecting various pieces of metadata other than sensing data and instrument information by existing communication protocols and associating the sensing data, the instrument information, and the metadata with each other without errors. A data collection system 301 is a data collection system that performs communication from a terminal 11 to a data collection unit 12 by one or a plurality of communication protocols, in which the terminal 11 includes a detection unit 11e other than a sensor device 11a that detects the sensing data and the instrument information, and stores metadata that is information detected by the detection unit 11e in an extended field specified by the communication protocols within a frame specified by the communication protocols for transmitting the sensing data or the instrument information, and the data collection unit 12 associates the sensing data, the instrument information, and (Continued)

the metadata with each other based on information for identifying the terminal 11 described in the frame.

9 Claims, 8 Drawing Sheets

(56) References Cited

U.S. PATENT DOCUMENTS

| | | | |
|---|---|---|---|
| 2015/0019710 A1* | 1/2015 | Shaashua | G06F 16/35 |
| | | | 709/224 |
| 2020/0026339 A1* | 1/2020 | Sebastian | H04L 67/125 |
| 2020/0137021 A1* | 4/2020 | Janakiraman | H04L 63/10 |
| 2021/0184886 A1* | 6/2021 | Maeda | H04L 69/16 |
| 2021/0360404 A1* | 11/2021 | Lee | H04W 4/20 |
| 2022/0386090 A1* | 12/2022 | Temkin | H04L 67/12 |
| 2023/0336448 A1* | 10/2023 | Tamaki | H04L 41/0853 |

OTHER PUBLICATIONS

Toshihiko Oda et al., An Approach of Defining, Generating and Utilizing Metadata for Sensing Data Trading Market, The 32nd Annual Conference of the Japanese Society for Artificial Intelligence, 2018, Jun. 5, 2018.

LAN/MAN Standards Committee of the IEEE Computer Society, IEEE Standard for Local and metropolitan area networks-Station and Media Access Control Connectivity Discovery, IEEE Std 802.1AB™-2016, Mar. 11, 2016.

The Telecommunication Technology Committee, HTIP: Home-network Topology Identifying Protocol, TTC Standard JJ-300.00, Version 3.0, May 25, 2017.

* cited by examiner

DATA COLLECTION SYSTEM AND DATA COLLECTION METHOD

CROSS-REFERENCE TO RELATED APPLICATIONS

This application is a 371 U.S. National Phase of International Application No. PCT/JP2020/007248, filed on Feb. 21, 2020. The entire disclosure of the above application is incorporated herein by reference.

TECHNICAL FIELD

The present disclosure relates to sensing data collection in the Internet of Things (IoT).

BACKGROUND ART

Network configuration information or instrument information of a terminal or an instrument is acquired using a lightweight communication protocol that is standardized and does not need high performance. For example, NPL 1 reports a method using link layer discovery protocol (LLDP).

In the IoT, a large number of sensor terminals are connected to a network to collect data (sensing data) generated by these sensor terminals. In addition, in data utilization in the IoT, the importance of not only sensing data generated by the sensor terminals but also data relating to the sensing data called metadata has been reported (NPL 2 or the like), and it is expected that users can utilize the sensing data safely and easily by acquiring and distributing the sensing data and the metadata together. For example, in a case where LLDP disclosed in NPL 1 is used, metadata (instrument information) such as a maker's name or a model number related to the sensing data can be collected with an economical system configuration.

CITATION LIST

Non Patent Literature

NPL 1: Yoshiyuki Mihara, Takefumi Yamazaki, Manabu Okamoto, Atsushi Sato, "Designing HTIP which Identifies Home Network Topology and Applying HTIP to a Troubleshooting Application", Transactions of Information Processing Society of Japan Consumer Devices & Systems, Vol. 2, No. 3, pp. 34-45, December 2012.
NPL 2: Toshihiko Oda, Hiroshi Imai, Takeshi Naito, Hajime Takebayashi, "An Approach of Defining, Generating and Utilizing Metadata for Sensing Data Trading Market", Proceedings of the Annual Conference of the Japanese Society for Artificial Intelligence, 2018 (32nd), June 2012.
NPL 3: IEEE Std 802.1AB-2016, "IEEE Standard for Local and metropolitan area networks-Station and Media Access Control Connectivity Discovery" NPL 4: TTC Standard JJ-300.00, "HTIP: Homenetwork Topology Identifying Protocol, Third Edition", May 25, 2017

SUMMARY OF THE INVENTION

Technical Problem

Metadata includes not only instrument information such as a product name/model number but also information relating to installation conditions such as the installation position/installer of a sensor instrument and information relating to a target to be observed by a sensor device (see, for example, NPL 2).

As a method of collecting this metadata which is information other than instrument information, it is conceivable to develop/construct a dedicated system and collect the metadata, or to manually collect the metadata and then associate the collected metadata with separately collected sensing data. However, these approaches have the following difficulties.

(1) The development/construction of a plurality of systems or the manual collection and operation will increase costs and complicate operations.
(2) Errors (for example, human errors) occur when separately acquired sensing data and metadata are associated with each other.

While a collection method for solving these difficulties is expected, specific measures have not been revealed. Consequently, in order to solve the above problems, an object of the present disclosure is to provide a data collection system and a data collection method which are capable of collecting various pieces of metadata other than sensing data and instrument information by existing communication protocols and associating the sensing data, the instrument information, and the metadata with each other without errors.

Means for Solving the Problem

In order to solve the above problems, in the data collection system according to the present disclosure, a center terminal transmits various pieces of metadata by the extension or option function of existing communication protocols used to collect sensing data or instrument information.

Specifically, according to the present disclosure, there is provided a data collection system that performs communication from a terminal to a data collection unit by one or a plurality of communication protocols, in which the terminal includes a detection unit other than a sensor device that detects sensing data and instrument information, and stores metadata that is information detected by the detection unit in an extended field specified by the one or the plurality of communication protocols within a frame specified by the one or the plurality of communication protocols for transmitting the sensing data or the instrument information, and the data collection unit associates the sensing data, the instrument information, and the metadata with each other based on information for identifying the terminal described in the frame.

In addition, according to the present disclosure, there is provided a data collection method for performing communication from a terminal to a data collection unit by one or a plurality of communication protocols, the method including acquiring, by the terminal, metadata that is information detected by a detection unit other than a sensor device that detects sensing data and instrument information, storing, by the terminal, the metadata in an extended field specified by the one or the plurality of communication protocols within a frame specified by the one or the plurality of communication protocols for transmitting the sensing data or the instrument information, and associating, by the data collection unit, the sensing data, the instrument information, and the metadata with each other based on information for identifying the terminal described in the frame.

Because the center terminal transmits various pieces of metadata by the extension or option function of existing communication protocols, the data collection unit can collectively collect the sensing data, the instrument information, and various pieces of metadata. Thus, it is possible to achieve an economical and reliable system by avoiding an increase in costs, complication of operation, and occurrence of errors when the sensing data, the instrument information, and the metadata are associated with each other, which have been problems in methods of the related art.

Thus, the present disclosure can provide a data collection system and a data collection method which are capable of collecting various pieces of metadata other than sensing data and instrument information by existing communication protocols and associating the sensing data, the instrument information, and the metadata with each other without errors.

There is a limitation to the size of an extended field in a frame of a standardized communication protocol. Thus, it is preferable that the terminal processes and stores the metadata to fit into the extended field, or divides the metadata to fit into the extended field and stores the divided metadata in a plurality of frames.

In addition, the terminal may make, as the metadata, a record in which the information detected by the detection unit is accumulated for a certain period of time or a result obtained by performing specific calculation.

The terminal may change, spontaneously or in accordance with an instruction from the data collection unit, at least one of a detail detected by the detection unit or a timing at which the detection unit detects information.

It is preferable that the one or the plurality of communication protocols of the frame in which the metadata is stored are link layer discovery protocol (LLDP) or home-network topology identifying protocol (HTIP). LLDP and HTIP are lightweight communication protocols that are standardized in the data collection system of the IoT and do not need high performance. It is possible to avoid an increase in system cost and the complication of operations by adopting these communication protocols.

In this case, the terminal can change a transmission interval of the frame spontaneously or in accordance with an instruction from the data collection unit.

Effects of the Invention

The present disclosure can provide a data collection system and a data collection method which are capable of collecting various pieces of metadata other than sensing data and instrument information by existing communication protocols and associating the sensing data, the instrument information, and the metadata with each other without errors.

DESCRIPTION OF EMBODIMENTS

Embodiments of the present disclosure will be described below with reference to the accompanying drawings. The embodiments to be described below are examples of the present disclosure, and the present disclosure is not limited to the following embodiments. In this description and the drawings, constituent elements having the identical reference signs are assumed to be the same as each other.

Embodiment 1

Figure 1:
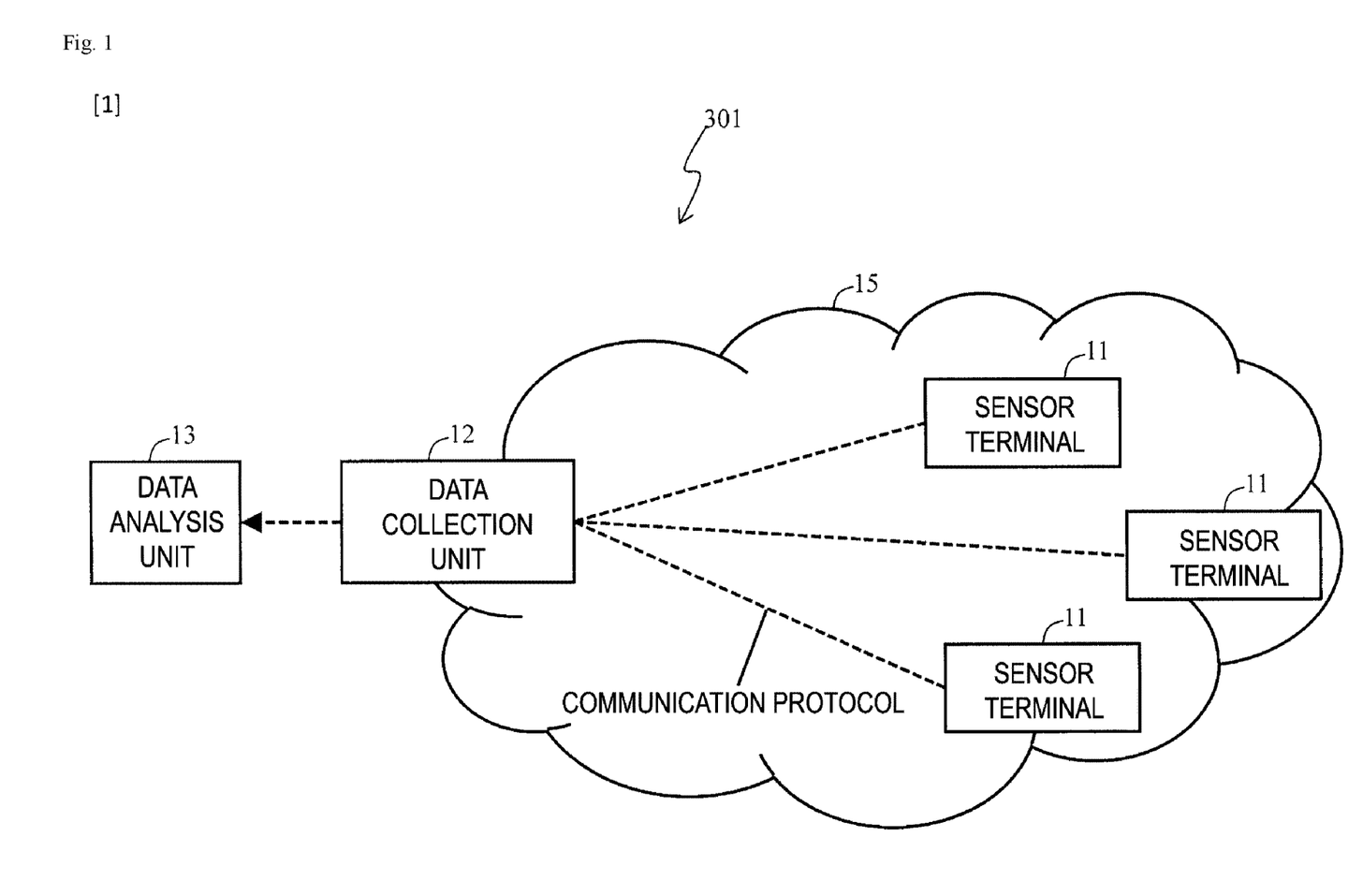
FIG. 1 is a diagram illustrating a data collection system according to the present disclosure.

FIG. 1 is a diagram illustrating a data collection system 301 according to the present embodiment. The data collection system 301 is a data collection system that performs communication from a terminal 11 to a data collection unit 12 by one or a plurality of communication protocols, in which the terminal 11 includes a detection unit 11e other than a sensor device 11a that detects sensing data and instrument information and stores metadata that is information detected by the detection unit 11e in an extended field specified by the communication protocols within a frame specified by the communication protocols for transmitting the sensing data or the instrument information, and the data collection unit 12 associates the sensing data, the instrument information, and the metadata with each other based on information for identifying the terminal 11 described in the frame.

A data collection network 15 is a network that connects the sensor terminal 11 present in a specific range and the data collection unit 12. The data collection network 15 is, for example, a local area network (LAN), a field area network (FAN), an IoT area network, and the like.

The sensor terminal 11 senses a target for observation and generates sensing data. In the same data collection network 15, there may be a plurality of sensor terminals 11 of a single type and there may be multiple types of sensor terminals. The sensor terminal 11 collectively transmits the sensing data, the instrument information, and the metadata to the data collection unit 13 by one or a plurality of communication protocols. The details of the sensor terminal 11 will be described below.

Various protocols for data communication such as wireless (Wi-Fi, LPWA), conducting wires (Ethernet (trade name), PLC, Single Pair Ethernet), or optical fiber (Ethernet, PON), as well as various protocols for instrument information collection such as LLPD, a home network protocol such as HTIP, and the like can be given as examples of the communication protocol. In addition, communication protocols used in the data collection network 15 may be of a single type or may be of multiple types.

The data collection unit 12 is, for example, an IoT gateway, an access point, or any of various other storage devices. The data collection unit 12 passes the collected sensing data, instrument information, and metadata as information in a state associated with the sensor terminal 11 to a data analysis unit 13. The details of the data collection unit 12 will also be described below.

The data analysis unit 13 stores the information passed from the data collection unit 12 and uses the stored information for analysis. The data analysis unit 13 may be in the same device as the data collection unit 12 or may be in a separate device. In a case where the data analysis unit is in a separate device, it may be located away from the data collection unit 12 through a network.

Figure 2:
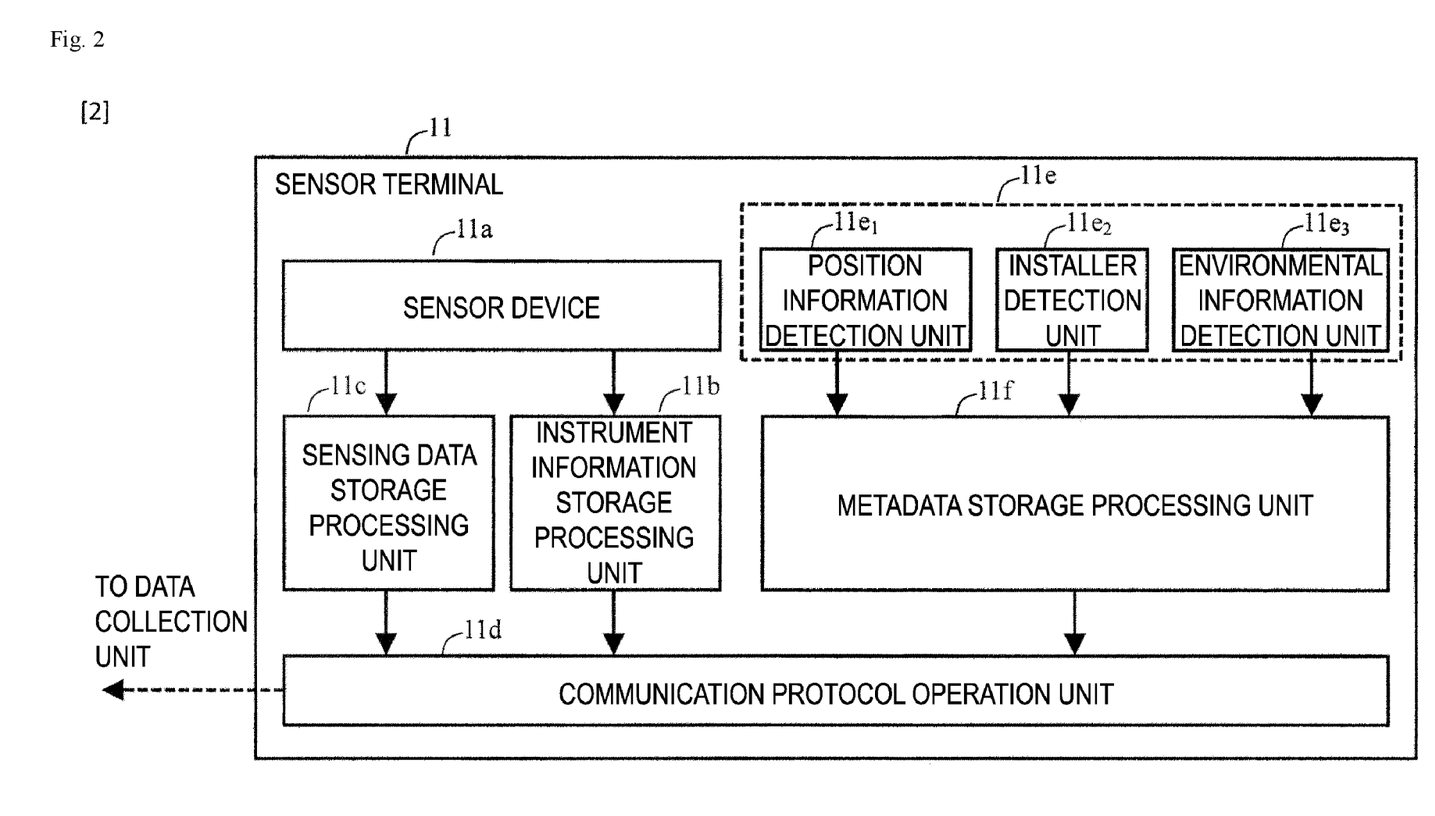
FIG. 2 is a diagram illustrating a terminal included in the data collection system according to the present disclosure.

FIG. 2 is a diagram illustrating the sensor terminal 11. The sensor terminal 11 includes the sensor device 11a, an instrument information storage processing unit 11b, a sensing data storage processing unit 11c, a protocol operation unit 11d, the detection unit 11e, and a metadata storage processing unit 11f. The sensor device 11a senses a target for observation. The instrument information storage processing unit 11b collects instrument information of a target for observation (such as, for example, the maker's name, model name, and model number of an instrument), and stores the information at a predetermined position in a frame (a field that can be used for an original application such as an "extended field" or an "optional field" specified by protocols). The sensing data storage processing unit 11c stores the sensing data from the sensor device 11a at a predetermined position in a frame (such as a payload portion specified by protocols).

The detection unit 11e acquires information (metadata) other than the instrument information. In the present embodiment, the information other than the instrument information is position information of a target for detection, installer information, and environmental information. However, the present disclosure does not limit the information other than the instrument information to such pieces of information. The detection unit 11e includes a position information detection unit $11e_1$, an installer detection unit $11e_2$, and an environmental information detection unit $11e_3$ in order to acquire such pieces of information. The position information detection unit $11e_1$ is, for example, a GPS, an acceleration sensor, a gyro sensor, or an RSSI receiver of a Wi-Fi signal, a BLE beacon signal, or the like. The installer detection unit $11e_2$ is, for example, a fingerprint sensor, a vein sensor, a camera (face/iris recognition), or a microphone (voiceprint detection) in a case where an installer is identified, and is a receiver that receives output values of a sensor worn by the installer (such as blood pressure, heartbeat, movement speed, speech, or conversation) in a case where the status of the installer is confirmed. The environmental information detection unit $11e_3$ is, for example, a camera (video information) or an environmental sensor of temperature, humidity, illuminance, air pressure, sound, infrared/ultraviolet light, or the like.

Meanwhile, the detection unit 11e may detect all of a plurality of targets for detection or may detect any one of them.

The metadata storage processing unit 11f stores the data detected by the detection unit 11e as metadata in an extended field or an optional field within a frame which is set by a communication protocol.

The protocol operation unit 11d transmits a frame in which the sensing data or the instrument information is stored in a predetermined field and metadata is stored in an extended field or an optional field to the data collection unit 12. Meanwhile, the communication protocol of a frame in which the sensing data is stored and the communication protocol of a frame in which the instrument information is stored may be the same as each other or may be different from each other. In the latter case, the metadata storage processing unit 11f may store the metadata in a frame of any one communication protocol (a frame in which the sensing data is stored or a frame in which the instrument information is stored), or may store the metadata in frames of both communication protocols (a frame in which the sensing data is stored and a frame in which the instrument information is stored).

In order to comply with the format/limitation of a specific extended field of a frame, the metadata storage processing unit 11f may store the metadata in a frame after processing such as converting the metadata into a certain abbreviated code and then storing it, or dividing the metadata and then storing them into a plurality of frames (fragmentation).

The metadata storage processing unit 11f can freely set a storage timing at which the metadata is stored in a frame. For example, the storage timing may be set each time the metadata is updated, or the metadata may be stored at a timing when the metadata is accumulated for a certain period of time instead of being stored sequentially. In addition, in a case where the metadata is accumulated for a certain period of time, the metadata storage processing unit 1 if may store, in a frame, the record (log) of the accumulation or the result of specific calculation/statistical processing.

The detail and storage timing of the metadata stored in a frame may be fixed or variable. The detail and storage timing of the metadata may be dynamically changed according to the decision of the sensor terminal 11 itself or instructions from the data analysis unit 13 and the data collection unit 12.

Figure 3:
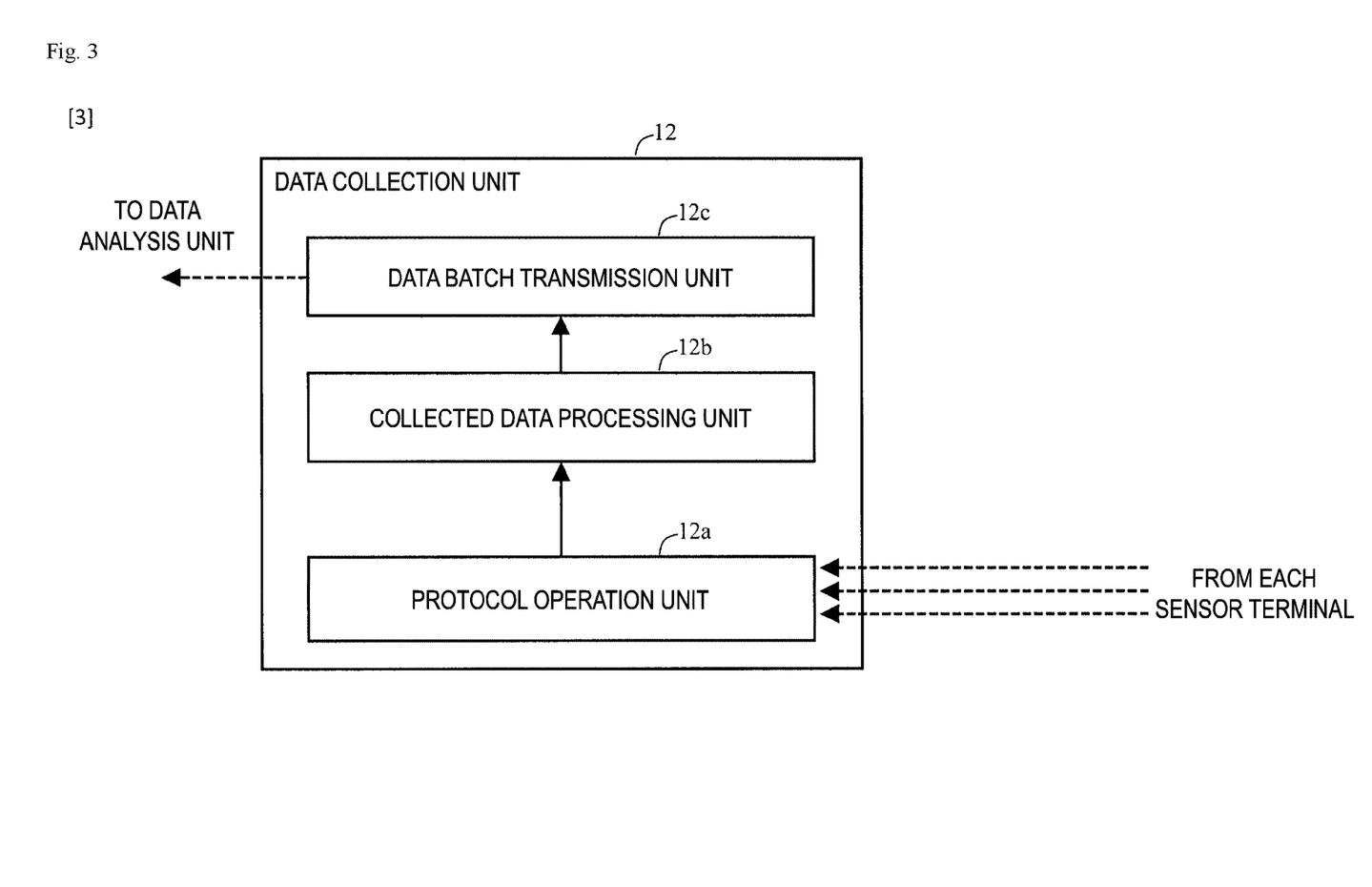
FIG. 3 is a diagram illustrating a data collection unit included in the data collection system according to the present disclosure.

FIG. 3 is a diagram illustrating the data collection unit 12. The data collection unit 12 includes a protocol operation unit 12a, a collected data processing unit 12b, and a data batch transmission unit 12c. The protocol operation unit 12a receives a frame in which the metadata is stored in a specific extended field from the sensor terminal 11. The collected data processing unit 12b extracts the sensing data, the instrument information, and the metadata from the received frame, and arranges them in a database based on information (example: a MAC address) for identifying the individual of the sensor terminal 11. The data batch transmission unit 12c stores the data arranged in the database at a predetermined timing in a payload portion of a frame and transmits the frame to the data analysis unit 13. The data batch transmission unit 12c may transmit only a portion of the data in the database or may transmit all the data, in accordance with the requirements of the data analysis unit 13.

Embodiment 2

Figure 4:
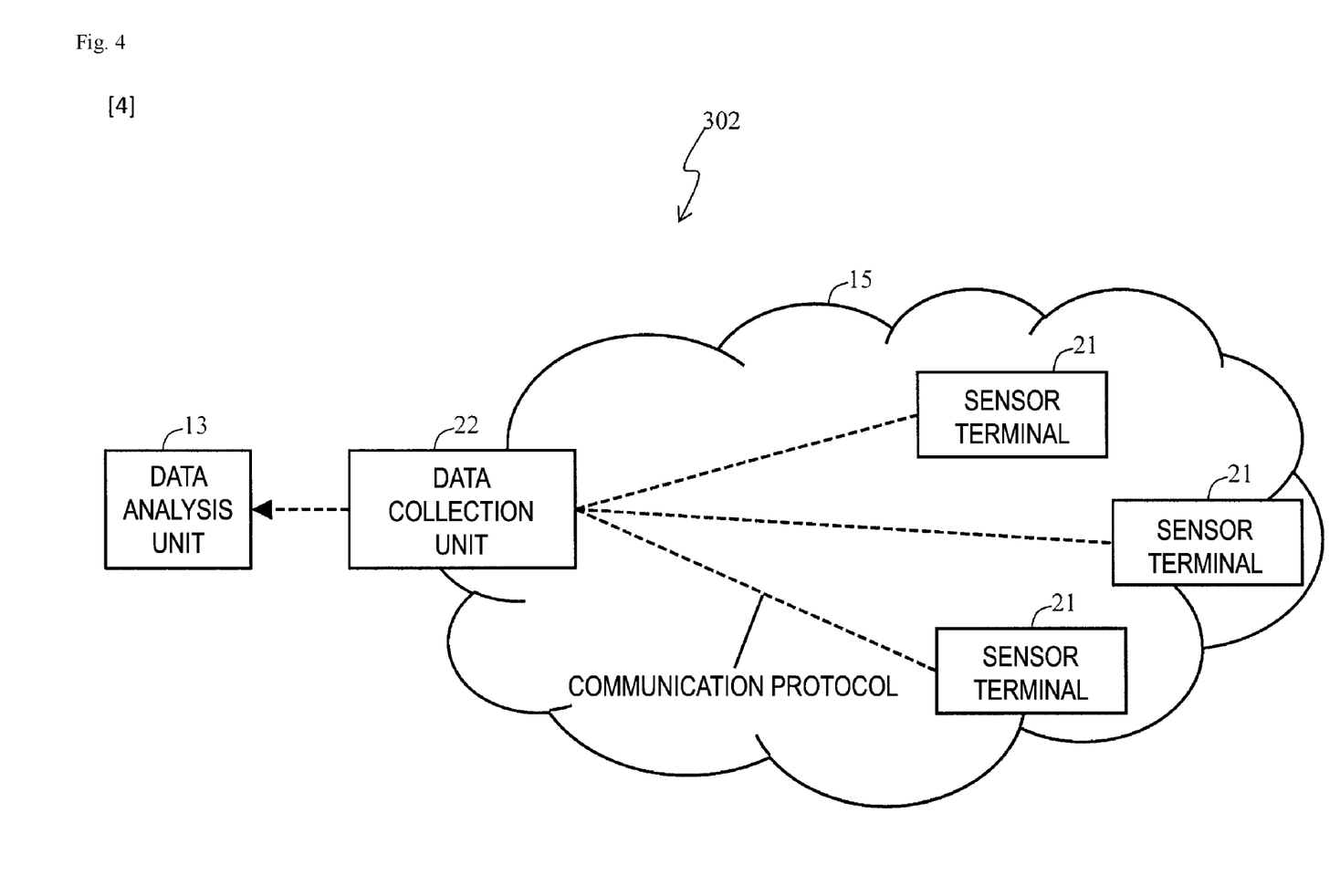
FIG. 4 is a diagram illustrating a data collection system according to the present disclosure.

FIG. 4 is a diagram illustrating a data collection system 302 of the present embodiment. The data collection system 302 is different from the data collection system 301 of FIG. 1 in that it includes a sensor terminal 21 as a substitute for the sensor terminal 11 and a data collection unit 22 as a substitute for the data collection unit 12 and that the communication protocol of a frame in which the metadata is stored is LLDP or HTIP. In the present embodiment, differences from the data collection system 301 of Embodiment 1 will be described.

Figure 5:
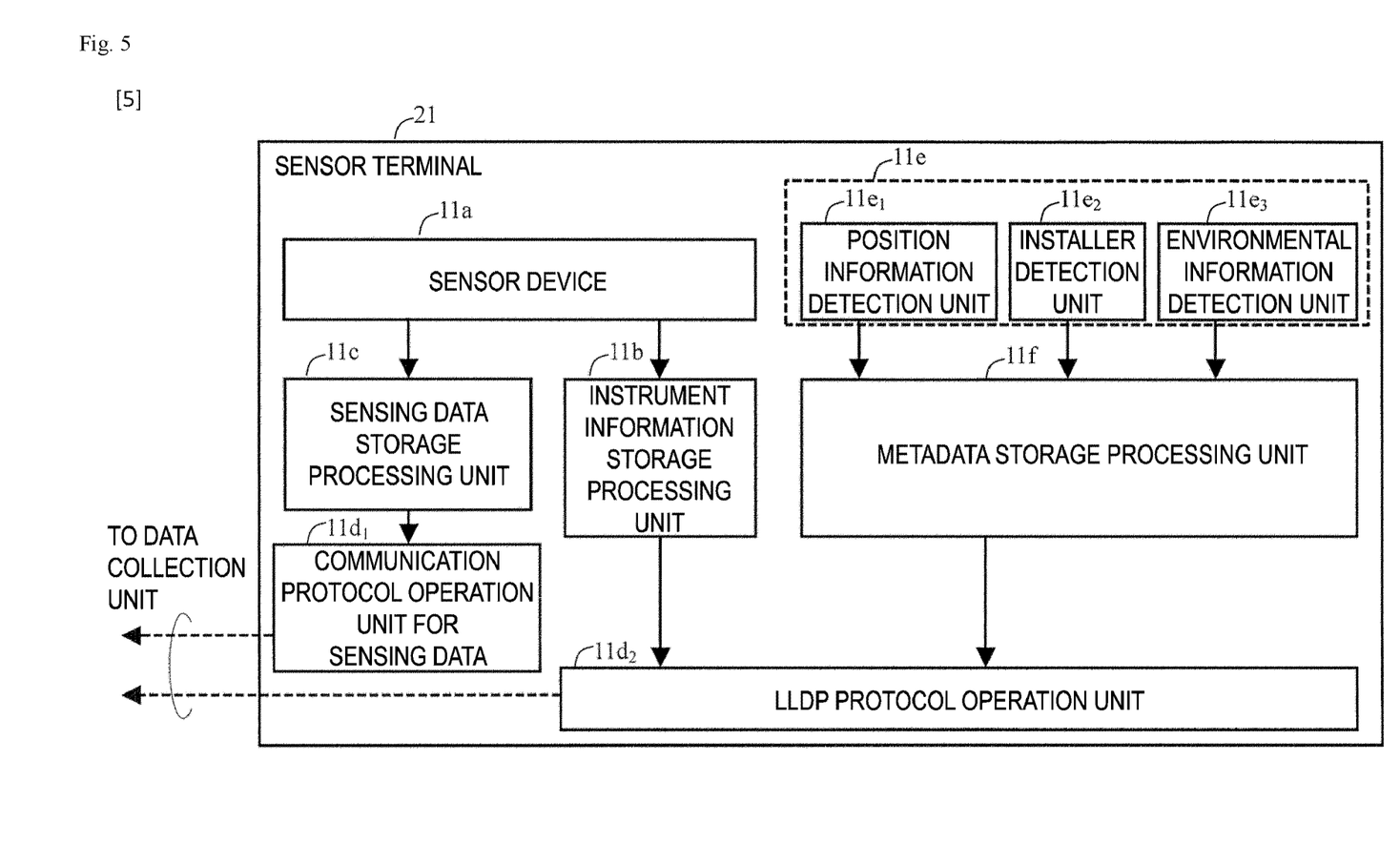
FIG. 5 is a diagram illustrating a terminal included in the data collection system according to the present disclosure.

FIG. 5 is a diagram illustrating the sensor terminal 21. The sensor terminal 21 includes a communication protocol operation unit for sensing data $11d_1$ and an LLDP protocol operation unit $11d_2$ as a substitute for the communication protocol operation unit 11d of the sensor terminal 11.

The communication protocol operation unit for sensing data $11d_1$ transmits a frame in which the sensing data is stored by the sensing data storage processing unit 11c to the data collection unit 22 using any communication protocol (such as, for example, Ethernet (trade name), Wi-Fi, or LPWA).

The LLDP protocol operation unit $11d2$ transmits a frame in which instrument information such as the product name/model number of the sensor terminal 21 and network configuration information are stored by the instrument information storage processing unit 11b and various pieces of metadata are stored by the metadata storage processing unit 1 if to the data collection unit 22 using LLDP or HTIP. How the instrument information storage processing unit 11b and the metadata storage processing unit 11f store this information in a frame will be described below. Meanwhile, the LLDP protocol operation unit $11d_2$ may fix the transmission interval of the frame, or may change it spontaneously or in accordance with an instruction from the data collection unit.

Figure 6:
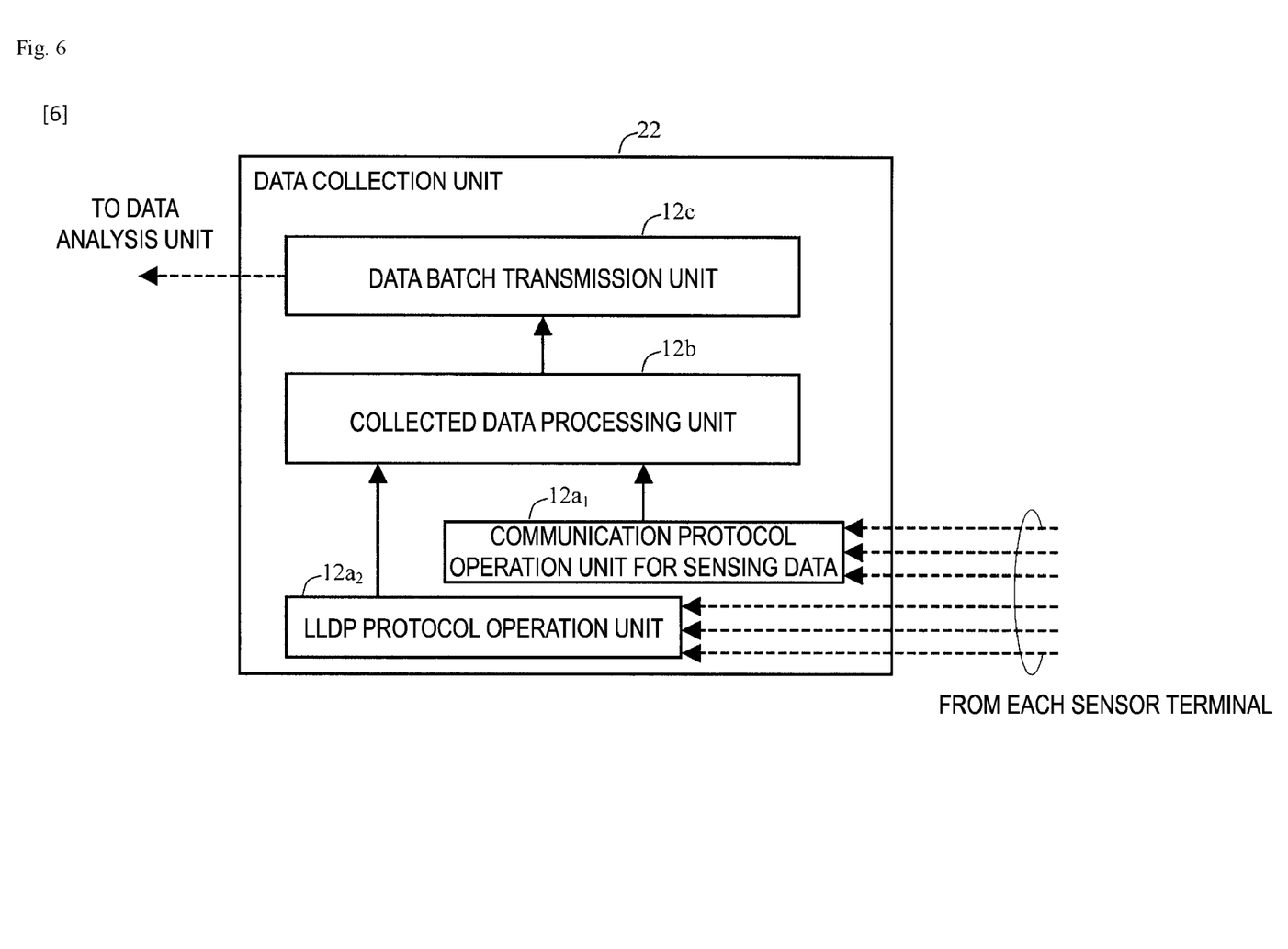
FIG. 6 is a diagram illustrating a data collection unit included in the data collection system according to the present disclosure.

FIG. 6 is a diagram illustrating the data collection unit 22. The data collection unit 22 includes a communication protocol operation unit for sensing data $12a_1$ and an LLDP protocol operation unit $12a_2$ as a substitute for the protocol operation unit 12a of the data collection unit 12. The communication protocol operation unit for sensing data $12a_1$ receives a frame in which the sensing data transmitted from each sensor terminal 21 is stored. The LLDP protocol operation unit $12a_2$ receives a frame in which the instrument information and the metadata transmitted from each sensor terminal 21 are stored.

The collected data processing unit 12b extracts the sensing data, the instrument information, and the metadata from each received frame, and arranges them in a database based on information for identifying the individual of the sensor terminal 11. The information for identifying the individual of the sensor terminal 11 is, for example, a MAC address which is commonly used in a communication protocol for sensing data and an LLDP protocol. The collected data processing unit 12b associates the sensing data, the instrument information, and the metadata with each other based on this MAC address.

Figure 7:
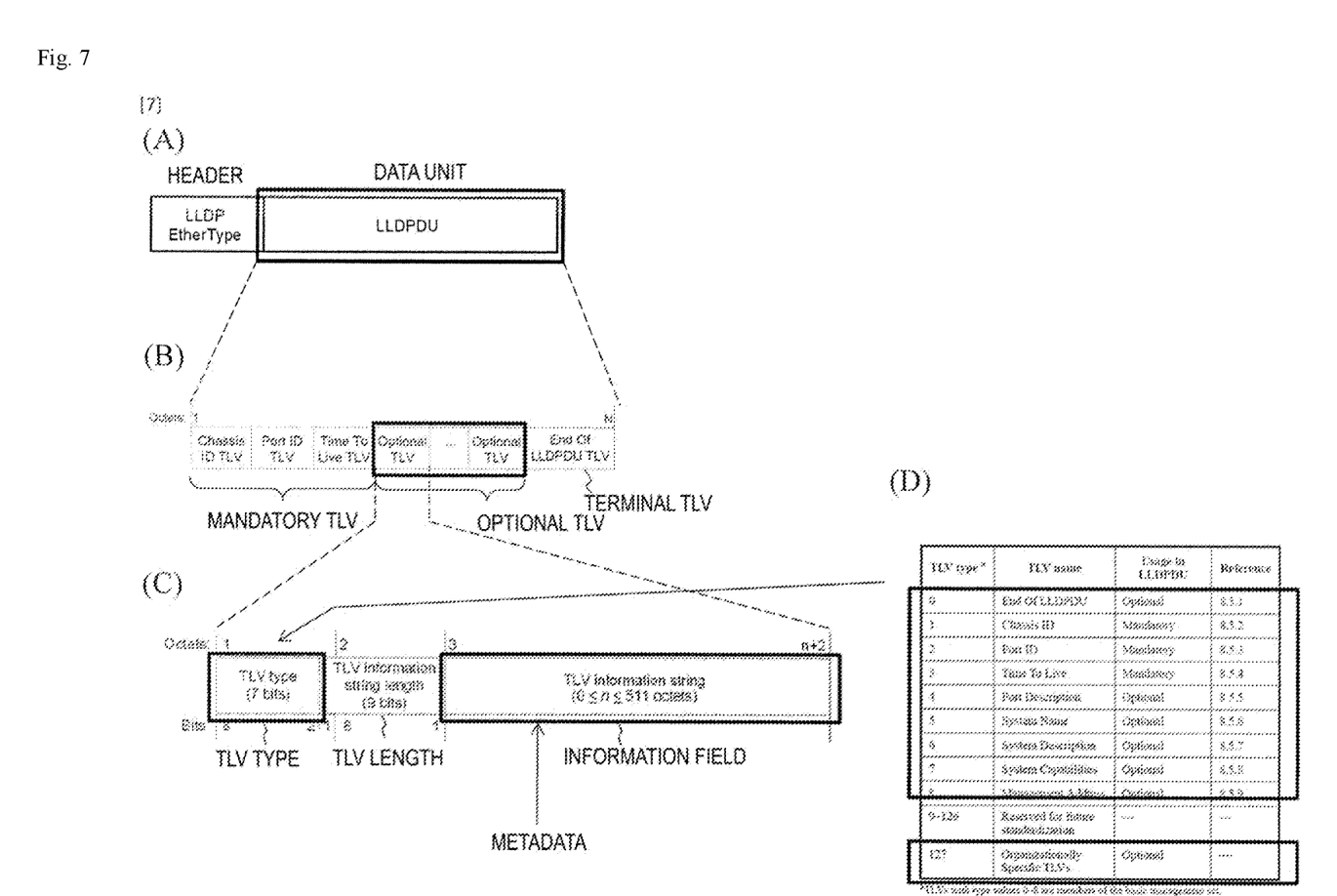
FIG. 7 is a diagram illustrating an example in which the data collection system according to the present disclosure stores instrument information and metadata in a frame.

FIG. 7 is a diagram illustrating an example in which instrument information and metadata are stored in a frame in a case where the LLDP protocol operation unit $11d_2$ adopts LLDP (see, for example NPL 3) as a communication protocol. FIG. 7(A) is a diagram illustrating a frame structure of LLDP. The frame of LLDP is constituted by a header and a data unit. FIG. 7(B) is a diagram illustrating a format of the data unit. The data unit is constituted by a mandatory TLV, an optional TLV, and a terminal TLV. FIG. 7(C) is a diagram illustrating a format of one optional TLV. The optional TLV is constituted by a TLV type, a TLV length, and an information field. FIG. 7(D) is a list of optional TLV types. In a case where "1" to "8" are input to the TLV type, various pieces of information such as a device name, a maker's name, a MAC address, or an IP address can be stored as instrument information in the information field of the optional TLV. In addition, in a case where "127" is input to the TLV type, the information field of the optional TLV becomes an extended field, which makes it possible to store metadata.

Figure 8:
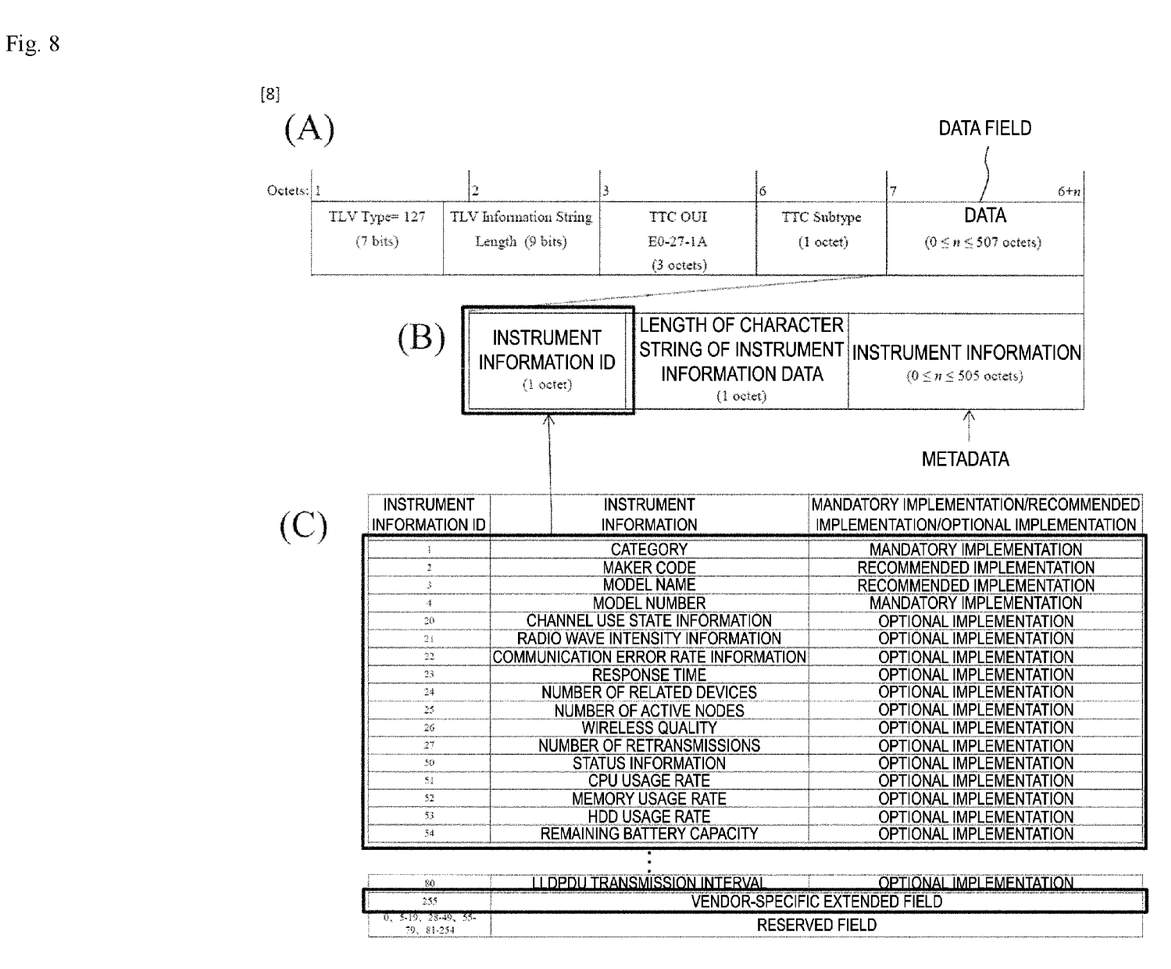
FIG. 8 is a diagram illustrating an example in which the data collection system according to the present disclosure stores instrument information and metadata in a frame.

FIG. 8 is a diagram illustrating an example in which instrument information and metadata are stored in a frame in a case where the LLDP protocol operation unit $11d_2$ adopts HTIP (see, for example, NPL 4) as a communication protocol. FIG. 8(A) is a diagram illustrating a frame structure of HTIP. The frame of HTIP is constituted by a field for describing a TLV type and length and a data field. FIG. 8(B) is a diagram illustrating a format of the data field. The data field is constituted by an instrument information ID, an instrument information data length, and instrument information. FIG. 8(C) is a list of instrument information IDs. In a case where "1" to "4", "20" to "27", and "50" to "54" are input to the instrument information ID, various pieces of information such as a device name, a maker's name, a MAC address, or an IP address can be stored as instrument information in the instrument information field of the data field. In addition, in a case where "255" is input to the instrument information ID, the instrument information field of the data field becomes a vendor-specific extended field, which makes it possible to store metadata.

OTHER EMBODIMENTS

The sensor terminal (11, 21) and the data collection unit (12, 22) described above can also be implemented by a computer and a program, and the program can also be recorded in a recording medium or provided through a network.

REFERENCE SIGNS LIST 11, 21 Sensor terminal
11a Sensor device
11b Instrument information storage processing unit
11c Sensing data storage processing unit
11d Protocol operation unit
$11d_1$ Communication protocol operation unit for sensing data
$11d_2$ LLDP protocol operation unit
11e Detection unit
$11e_1$ Position information detection unit
$11e_2$ Installer detection unit
$11e_3$ Environmental information detection unit
11f Metadata storage processing unit
12, 22 Data collection unit
12a Protocol operation unit
$12a_1$ Communication protocol operation unit for sensing data
$12a_2$ LLDP protocol operation unit
12b Collected data processing unit
12c Data batch transmission unit
13 Data analysis unit
15 Data collection network
301, 302 Data collection system

The invention claimed is:

1. A data collection system configured to perform communication from a terminal to a data collection unit by one or a plurality of communication protocols, the data collection system including:
the terminal;
the data collection unit,
wherein the terminal includes a detection unit other than a sensor device that detects sensing data and instrument information, and stores metadata that is information detected by the detection unit in an extended field specified by the one or the plurality of communication protocols within a frame specified by the one or the plurality of communication protocols for transmitting the sensing data or the instrument information, and
the data collection unit associates in a database the sensing data, the instrument information, and the metadata with each other based on information for identifying the terminal described in the frame; and
a data batch transmission unit that stores the associated data at a predetermined timing in a payload portion of a frame and transmits at least a portion of the associated data in accordance with requirements of a data analysis unit.

2. The data collection system according to claim 1, wherein the terminal processes and stores the metadata to fit into the extended field.

3. The data collection system according to claim 1, wherein the terminal divides the metadata to fit into the extended field and stores pieces of metadata that are divided in a plurality of frames.

4. The data collection system according to claim 1, wherein the terminal makes, as the metadata, a record where the information detected by the detection unit is accumulated for a certain period of time or a result obtained by performing specific calculation.

5. The data collection system according to claim 1, wherein the terminal changes, spontaneously or in accordance with an instruction from the data collection unit, at least one of a detail detected by the detection unit or a timing when the detection unit detects information.

6. The data collection system according to claim 1, wherein the one or the plurality of communication protocols of the frame where the metadata is stored are link layer discovery protocol (LLDP) or home-network topology identifying protocol (HTIP).

7. The data collection system according to claim 6, wherein the terminal changes a transmission interval of the frame spontaneously or in accordance with an instruction from the data collection unit.

8. A data collection method for performing communication from a terminal to a data collection unit by one or a plurality of communication protocols, the method comprising:
    acquiring, by the terminal, metadata that is information detected by a detection unit other than a sensor device that detects sensing data and instrument information;
    storing, by the terminal, the metadata in an extended field specified by the one or the plurality of communication protocols within a frame specified by the one or the plurality of communication protocols for transmitting the sensing data or the instrument information; and
    associating in a database, by the data collection unit, the sensing data, the instrument information, and the metadata with each other based on information for identifying the terminal described in the frame; and
    by a data batch transmission unit, storing the associated data at a predetermined timing in a payload portion of a frame and transmitting at least a portion of the associated data in accordance with requirements of a data analysis unit.

9. A data collection system configured to perform communication from a terminal to a data collection unit by one or a plurality of communication protocols, the data collection system including:
    the terminal;
    the data collection unit,
    wherein the terminal includes a detection unit other than a sensor device that detects sensing data and instrument information, and stores metadata that is information detected by the detection unit in an extended field specified by the one or the plurality of communication protocols within a frame specified by the one or the plurality of communication protocols for transmitting the sensing data or the instrument information, the extended field being an optional TLV field of the frame, and
    the data collection unit associates in a database the sensing data, the instrument information, and the metadata with each other based on information for identifying the terminal described in the frame; and
    a data batch transmission unit that stores the associated data at a predetermined timing in a payload portion of a frame and transmits at least a portion of the associated data in accordance with requirements of a data analysis unit.

* * * * *